United States Patent [19] [11] 3,908,812
Graff [45] Sept. 30, 1975

[54] APPARATUS FOR PACKING EITHER 25 OR 26 BOTTLES INTO A CONTAINER
[75] Inventor: William R. Graff, Lynchburg, Va.
[73] Assignee: Simplimatic Engineering Co., Lynchburg, Va.
[22] Filed: Mar. 20, 1973
[21] Appl. No.: 342,960

[52] U.S. Cl. .................. 198/22 B; 53/159; 53/247; 214/1 BV; 294/65
[51] Int. Cl.² ........................................ B65G 47/00
[58] Field of Search .................. 198/20, 22 R, 22 B; 53/159, 247, 39 D; 294/65; 214/1 Q, 1 BV

[56] References Cited
UNITED STATES PATENTS
3,302,967  2/1967  Harris et al. .................... 294/65
3,609,938  10/1971  Paddock ........................ 53/390 X
3,694,993  10/1972  East ............................ 214/1 BV X Primary Examiner—Evon C. Blunk
Assistant Examiner—Douglas D. Watts

[57] ABSTRACT

A bottle packing apparatus is disclosed having means for receiving a predetermined number of bottles in rows to form a first array. Immediately beneath the receiving means, movable means are provided for holding the number of bottles to be packed, said number being smaller than the predetermined number of bottles which are received by the receiving means and form the first array. Interposed between the receiving means and the holding means is a means for transferring the number of bottles to be packed from the receiving means to the holding means and retaining the nontransferred bottles. Means are provided for feeding additional bottles to the receiving means after the bottles to be packed are transferred such that the retained and additional bottles refill the receiving means to capacity. The bottles which are held on the holding means are rearranged from the first array to a second array to minimize the necessary packing space. Thereafter the bottles are inserted into the container.

18 Claims, 8 Drawing Figures

APPARATUS FOR PACKING EITHER 25 OR 26 BOTTLES INTO A CONTAINER

The present invention relates to bottle packing apparatus and more particularly to a bottle packing apparatus which receives and automatically rearranges an array of either 25 or 26 bottles in order to minimize the packing space required for the bottles.

The glass industry packs bottles, jars and the like in corrugated containers or cases prior to their shipment to the product manufacturer for filling with the individual products. The bottles are generally placed in the containers or cases in a rectangular array, for example four rows containing six bottles each, or a total of 24 bottles per case. In order to accomplish this, the bottles, as they come off the conveyor belt, are guided into four parallel adjacent stalls each having a capacity of six bottles. When the stalls are full, a gate closes preventing additional bottles from entering the stalls. The bottles are then placed into the container or case in the rectangular array by means of various types of materials handling equipment. This was not only the most convenient but also the most economical way to perform the packing function because in this array the bottles take up as little space as possible and therefore fit into a carton which is as small as possible.

However, it has been found that a great deal of breakage occurs during the bottle filling operations performed by the product manufacturer. In fact, the percentage of bottles broken during the filling operation may amount, on the average, to one or two bottles per case of 24. Because of this breakage problem, product manufacturers have insisted upon having one or two additional bottles packed in each case of bottles in order to replace the bottles which are broken during the filling operations. This has posed great problems to the bottle manufacturers because no longer is it possible to pack a neat, rectangular array of bottles in a case.

Because of the costs of corrugated containers it is still, however, extremely desirable to pack the bottles in the cases in such a way that a maximum number of bottles is packable into the smallest container possible. In order to accomplish this, packing arrays other than the standard rectangular arrays of a certain number of rows each having a given number of bottles, have had to be developed to utilize the space in the container most efficiently. Further, if 25 or 26 bottles must be packed into a particular carton, it is only possible at a great deal of expense and difficulty to pack this number of bottles into a container which is large enough to hold four rows of seven bottles each. In order to do this, it would be necessary to fill up the remaining space in the container such that the bottles cannot move relative to each other and thus break during the shipment of the container. Moreover, this wasted space is costly because the container must be larger than necessary and therefore more expensive for the packaging of a given number of bottles.

It is, therefore, the prime object of the present invention to provide bottle packaging apparatus which is capable of receiving bottles from a bottle conveyor and arranging them in an array to minimize the size of the carton necessary to package the desired number of bottles.

It is a further object of the present invention to provide a bottle packaging apparatus wherein the bottles are received from the bottle conveyor in a rectangular array and then rearranged into the packing array while retaining a certain number of bottles in the receiving portion of the apparatus, and wherein the bottles retained in the receiving portion of the apparatus are utilized during the next feeding operation as members of the incoming array.

It is another object of the present invention to provide a bottle packaging apparatus which can be converted to pack either 25 or 26 bottles in a container with minimum mechanical refinements.

It is still another object of the present invention to provide a bottle packing apparatus which is capable of packing bottles into a container in different arrays depending on the number of bottles to be packed.

In accordance with the present invention a bottle packing apparatus is provided having a means for receiving the bottles from a bottle conveyor. The bottles are received in the receiving means in rows forming a rectangular array. When the array is full, a gate prevents additional bottles from entering the receiving means. The receiving means is situated immediately above a bottle holding means. Interposed between the receiving means and the bottle holding means is a transferring means which acts as a gravity feed. The array of bottles in the receiving means contains a greater number of bottles than the number to be packed in the container. The transferring means will permit only the number of bottles to be packed to be deposited on the holding means. The remainder of the bottles are retained in the receiving means.

The holding means comprises two sets of movable suction cups, one set mounted on each side of a rotatable frame. Each of the cups is operably connected to a vacuum-producing source. One suction cup is present in each set of cups for each bottle which is to be packed in the container. When the bottles are deposited on the suction cups on one side of the frame, a vacuum is formed in each of the cups thus causing the bottle to adhere to the cup. Once the bottles have been deposited on the holding means, the receiving means, still containing the retained bottles, is lifted away from the holding means such that it will not interfere with the rotation of the frame. The frame rotates 180° thus placing the bottles adhering to it upside down and bringing the empty set of cups into position for loading. The suction cups are mounted on a frame such that they are movable relative to each other in order to rearrange the bottles in the packing array. The bottles from the cups on the bottom side of the frame are, after rearrangement, deposited in a container which is situated immediately below the holding means by turning off the vacuum source.

The receiving means, which still contains the retained bottles from the previous transfer, is moved back into position above the empty set of cups. The gate is opened and additional bottles from the conveyor travel into the receiving means. The bottles which were retained in the receiving means from the previous cycle are included in the new array as additional bottles enter the receiving means. When the receiving means is again filled to capacity the gate closes and the bottles are transferred. Thus, bottle receiving and bottle depositing are performed simultaneously by the holding means on opposite sides of the frame.

The number of bottles which are transferred to the holding means by the transferring means may be varied by simple mechanical refinements. In addition, the packing array can be varied in accordance with the number of bottles to be packed. These two features provide a great deal of versatility in the system.

To the accomplishment of the above and to such other objects as they may hereinafter appear, the present invention relates to a preferred embodiment of a bottle packaging apparatus as defined in the appended claims and as described in the specification, taken together with the accompanying drawings in which like numerals refer to like parts and wherein:

The bottle packaging apparatus of the present invention comprises a receiving means, generally designated A, into which bottles are fed from a feeding means, generally designated D. The bottles in the receiving means A are arranged in a rectangular receiving array. A transferring means, generally designated B, forms the floor of receiving means A. Situated immediately beneath the receiving means A is a rotatable frame E having separate sets of individual holding means, generally designated as C, situated on both sides thereof. After the receiving means A is full to capacity, a gate will close thus preventing any additional bottles from feed means D from entering the receiving means A. Transferring means B is then moved permitting the number of bottles to be packed to be transferred to holding means C. One bottle is deposited on each of the individual holding means C on the top side of frame E. On the top side of frame E the holding means C are formed in an array corresponding to the bottle array formed by receiving means A. The nontransferred bottles in the receiving means A are retained therein by transferring means B. After transfer of the bottles to the holding means C on the top side of the frame E is completed, receiving means A and transferring means B are moved such that they will not interfere with the rotation of frame E. Frame E is rotatable about an axis parallel to the plane of the frame. Frame E consists of two identical sets of parallel bars, one set on each side thereof. The parallel bars of each set are relatively movable with respect to each other in order to rearrange the bottles from the receiving array to the packing array.

Once the rotation of frame E and the rearrangement of the bottles have been completed, the bottles held by holding means C are deposited in a container which is situated immediately below the apparatus. This is accomplished by the releasing of each bottle by its respective holding means. Simultaneous with the release of the bottles by the holding means C on one side of frame E, the receiving means A and transferring means B move back to their original position immediately above the holding means C on the other side of the frame. The gate which prevents the feed means D from feeding any additional bottles to the receiving means A is opened and bottles are fed into receiving means A. The additional bottles, as they enter the receiving means, push the bottles which were retained in receiving means A into the new rectangular array. In this way, the bottles retained in the receiving means from the previous transfer need not be removed therefrom but are utilized during the next transfer. Once receiving means A is full to capacity, the gate on feed means D then closes and the bottles are transferred to the holding means C on the upward facing side of frame E. Thus bottles are received on one side of frame E simultaneously with the depositing of the bottles into a container by the other side.

Figure 1:
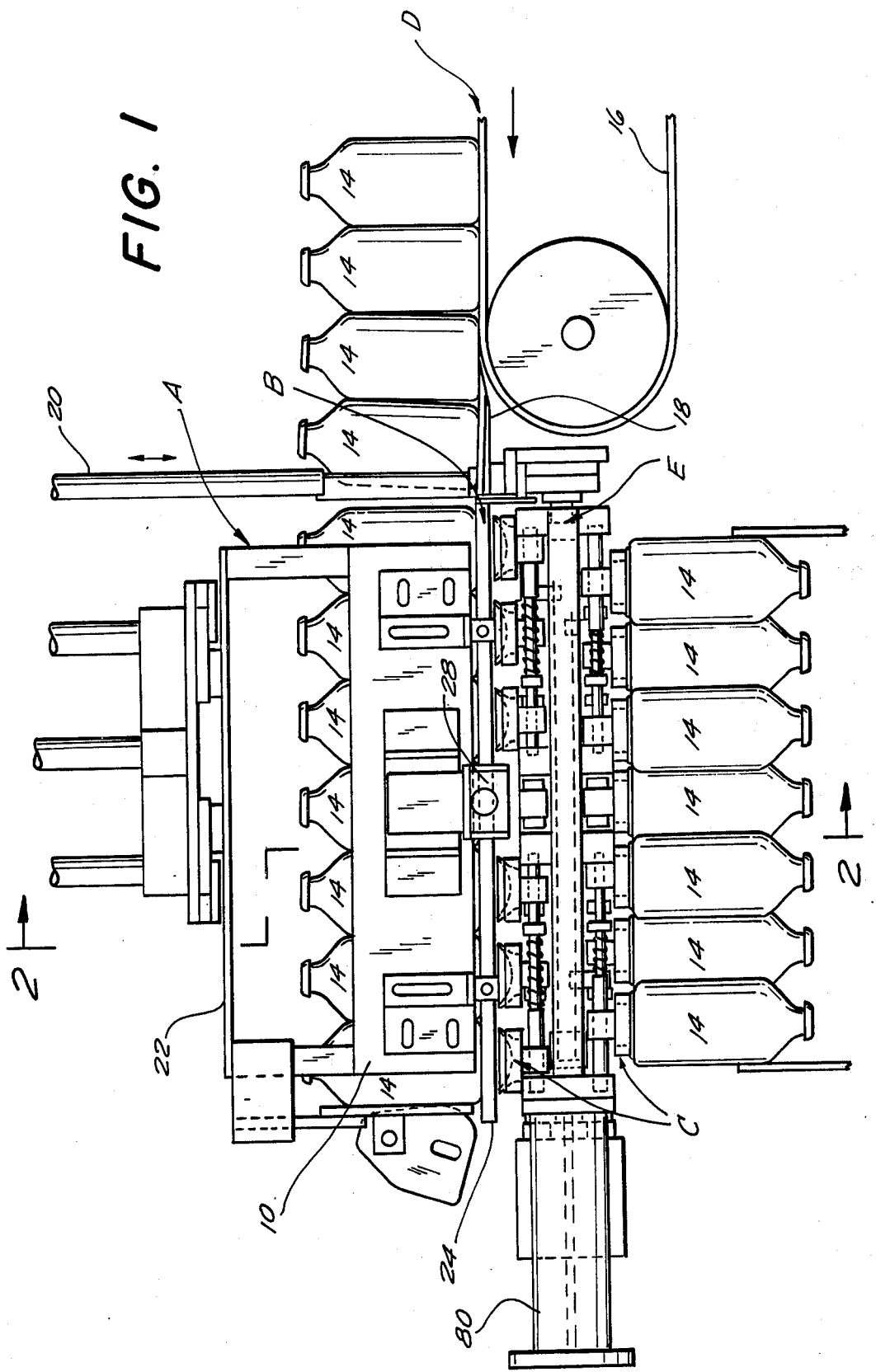
FIG. 1 is a side cross-sectional view of the preferred embodiment of the present invention.
Figure 2:
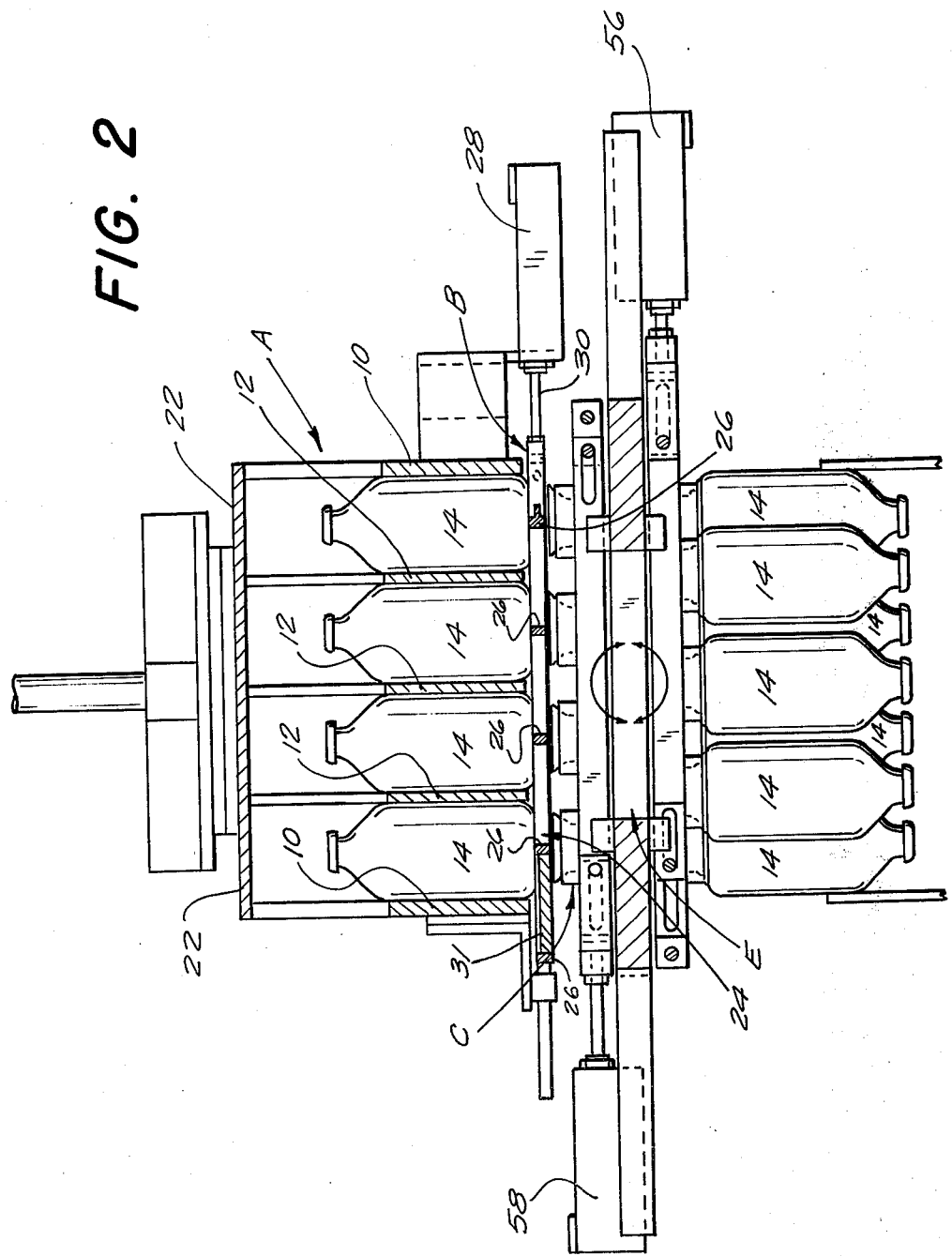
FIG. 2 is a front cross-sectional view taken along line 2—2 of FIG. 1.

More specifically, as seen in FIGS. 1 and 2, receiving means A comprises a box-like structure 10 having a plurality of dividers 12 which form stalls or guides into which the bottles 14 are received. Because of the box-like structure 10 of receiving means A and dividers 12, bottles 14 are received in receiving means A in rows which form a rectangular array. In the drawings, this array is shown to be four rows of seven bottles each.

The feed means D consists of a bottle conveyor 16 upon which incoming bottles are transferred from the previous manufacturing station to the bottle packing apparatus. Bottle conveyor 16 may consist of a commercially available conveyor belt. A ledge 18 protrudes from the side of the apparatus at the level of the conveyor to remove bottles 14 from conveyor 16. The pressure of the bottles as they move along conveyor belt 16 causes the bottles on ledge 18 to move toward receiving means A. A gate 20 is interposed between conveyor 16 and receiving means A. Gate 20 is operably connected to a motor (not shown) which may be activated to move gate 20 vertically with respect to ledge 18. The gate motor is operably connected to a sensing means (not shown) which will automatically actuate the motor to close the gate when receiving means A is filled to capacity with bottles 14. When the packing cycle is reinitiated, and receiving means A has been partially emptied, the motor will be automatically actuated to raise gate 20 to permit feed means D to feed additional bottles 14 to receiving means A.

Figure 3:
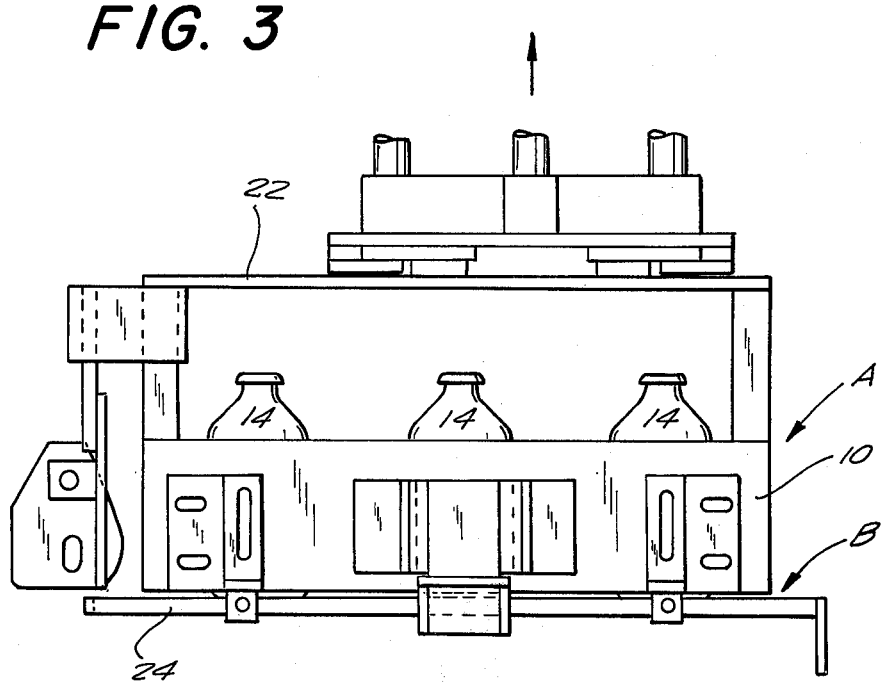
FIG. 3 is a side elevational view of the receiving means of the present invention.
Figure 4:
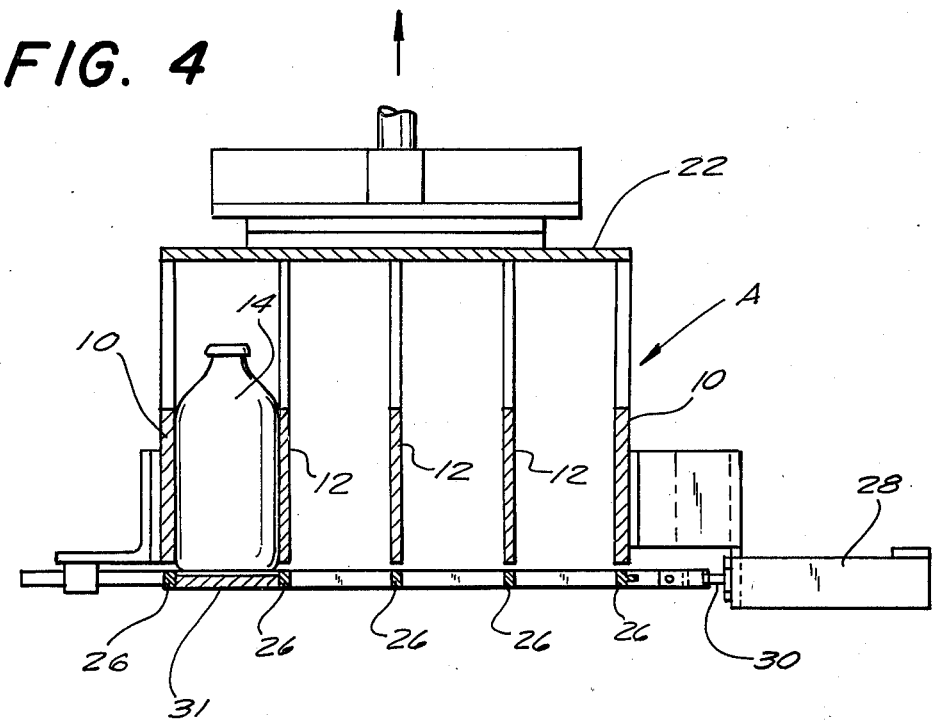
FIG. 4 is a front cross-sectional view of the receiving means and the transferring means of the present invention.

The top 22 of box-like structure 10 of receiving means A is operably connected to another motor (not shown) which is utilized to move receiving means A in the direction of the arrows shown in FIGS. 3 and 4. This movement of the receiving means A will place receiving means A in a position where it does not interfere with the rotation of frame E.

Transferring means B forms the bottom portion of box-like structure 10. When the bottles are received within receiving means A they will be supported by transferring means B. Transferring means B comprises an axially movable grid-like structure 24 which has a number of support bars 26 which run along the middle of each of the stalls formed by dividers 12. Support bars 26 form a support upon which bottles 14 within receiving means A rest, as seen in FIG. 2. A pneumatic cylinder 28, having a movable piston rod 30 which is operably connected to transferring means B, is provided to axially move transferring means B with respect to receiving means A. Transferring means B is axially movable between a first position, as shown in FIG. 2, wherein all of the bottles 14 in receiving means A are supported by bars 26 and a second position, shown in FIG. 4, wherein support bars 26 have been moved into vertical alignment with dividers 12 and thus no longer support the bottles.

Located between some of the adjacent support bars 26, in positions corresponding to the positions of certain bottles 14 within receiving means A, are additional support members 31. When cylinder 28 moves transferring means B into the second position, all of the bottles 14 within receiving means A will be removed by means of gravity from receiving means A except those which correspond in position to the additional support structures 31. Those bottles 14 which correspond in position to the additional support structures 31 will be retained by the additional support structures 31 within receiving means A as receiving means A is lifted out of the way of the apparatus. As many additional support members 31 can be provided as is necessary depending upon the capacity of receiving means A and the number of bottles which are to be packed. For instance, if the receiving means has a capacity of four rows of seven bottles each, totalling 28 bottles, and only 25 bottles are to be packed in each container, three additional support members 31 will be provided in appropriate positions to retain three of the bottles from the original rectangular array in the receiving means A. The remaining 25 bottles will be released from receiving means A as transferring means B moves to the second position thereby moving the supporting bars 26 out of position where the bars 26 can support the bottles.

Since transferring means B is operably connected to receiving means A it will move along with receiving means A as receiving means A is moved to a position where it will not interfere with the remainder of the bottle packing operation. The bottles which remain in receiving means A will be retained therein during the movement of receiving means A and transferring means B. The retained bottles in receiving means A will be utilized during the next transfer to once again form part of the rectangular array. However, during the next transfer they will be moved to a different position within the array by the force of the incoming additional bottles. They may then be located in a position within the rectangular array where an additional supporting member 31 is not present and therefore on the next cycle may be transferred from receiving means A. In this way, the bottles 14 which are retained on receiving means A need not be removed, but will be included in the next array formed during the subsequent cycle.

Figure 5:
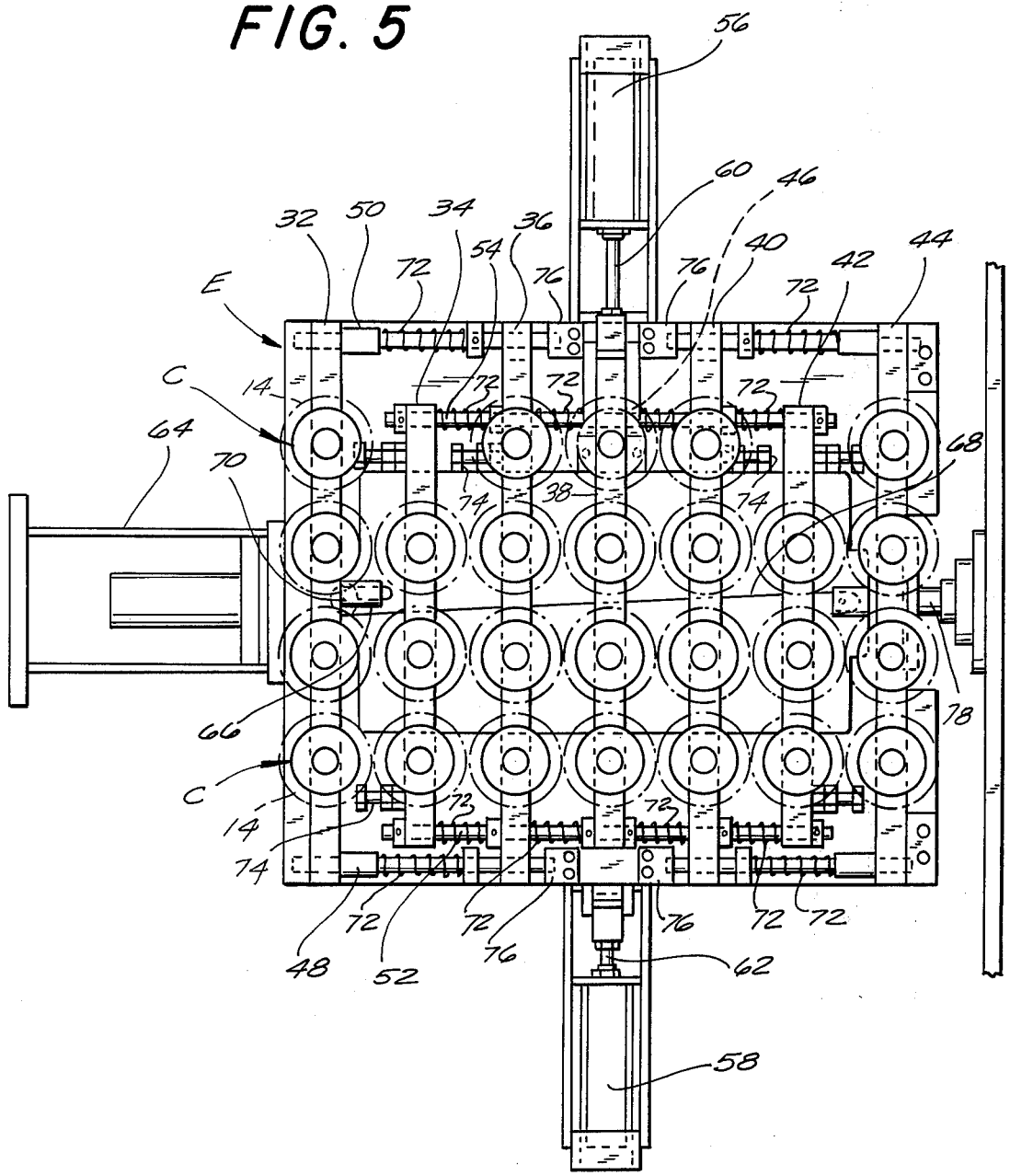
FIG. 5 is an elevational view of the holding means on the topside of the frame which is in the bottle receiving array.

Situated immediately below transferring means B are two sets of individual holding means C which are mounted on different sides of a frame-like structure E. As seen in FIG. 5, which shows the top side of the frame E, these holding means C comprise a plurality of suction cups each of which is operably connected to a vacuum-producing means. Frame E comprises two identical independent sets of parallel mounting structures 32, 34, 36, 38, 40, 42, and 44, one set on each side of the frame. Each of these mounting structures 32-44 has a plurality of apertures 33 therein, each of which is aligned with one of the suction cups mounted thereon. These apertures 33 provide an opening to permit a vacuum-producing means (not shown) to be operably connected to each of the suction cups. In the initial position of the parallel mounting structures 32-44, as shown in FIG. 5, the holding means C are aligned in a rectangular array similar to that of the array formed of bottles 14 within receiving means A. It will be noted, however, that certain of the suction cups are missing from mounting structures 32-44 which would normally create the full array.

The positions of the missing suction cups correspond to the positions on transferring means B of the additional support structures 31. Each of the other suction cups on the top side of frame E aligns with one of the bottles in receiving means A which will be deposited thereon when transferring means B is moved to the second position. The bottles which correspond in position to the missing cups will be retained in receiving means A when the remainder of the bottles are deposited one on each suction cup. Suction cup 46 is shown in FIG. 5 in dashed lines to indicate that this suction cup may or may not be present depending on whether 25 or 26 bottles are to be packed in the carton. If, for instance, 25 bottles are to be packed, there is no necessity for suction cup 46, and an additional support structure 31 will be present on transferring means B in this position to prevent the bottle 14 which occupies this position from being transferred from receiving means A. On the other hand, if 26 bottles are to be packed in the container, suction cup 46 will be present and there will be no additional support structure 31 on transferring means B in this position, thus permitting the bottle which occupies this position in the array to be released from receiving means A when transferring means B is moved to the second position.

After transferring means B has been moved to the second position thus releasing bottles 14 from receiving means A, each of the bottles is deposited by means of gravity onto the suction cup on the top side of frame E which corresponds in position to that bottle. A vacuum is created within each suction cup by the vacuum-producing means (not shown) such that the bottles are held by the suction means. At this point receiving means A and transferring means B are moved vertically with respect to frame E to a position where they will not interfere with the rotation of frame E.

Figure 6:
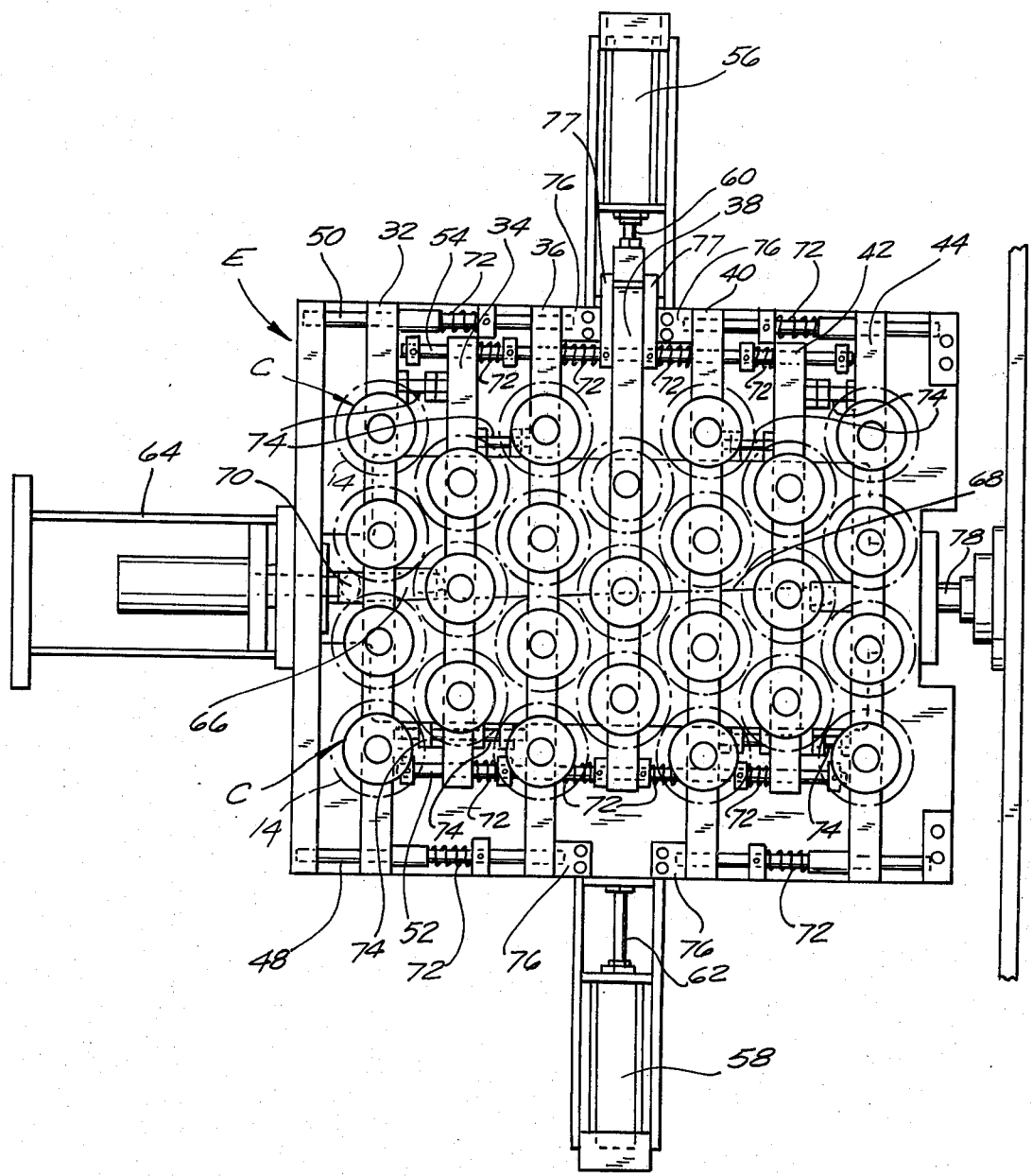
FIG. 6 is an elevational view of the holding means on the bottom side of the frame wherein the holding means have been repositioned to form a packaging array for 25 bottles.

On each side of frame E, parallel bars 32, 36, 42 and 44 are operably connected between perpendicular bars 48 and 50. Likewise, parallel bars 34 and 42 are operably connected to perpendicular bars 52 and 54. Parallel bar 38 is also connected between perpendicular bars 52 and 54 in the 25 bottle packing configuration (FIG. 6). In the 26 bottle packing configuration (FIG. 7), bar 38 is sideably mounted to bars 52 and 54 so as not to move with these bars, for reasons which will become apparent.

FIG. 6 shows a bottom view of frame E set up to deposit 25 bottles. Parallel bar 38 is operably connected to pneumatic cylinder 56 by means of piston rod 60. Bar 38, on each side of frame E, is operably connected to the corresponding perpendicular bars 52 and 54. The movement of rod 60 will move the bars 52 and 54 on one side of frame E with respect to bars 48 and 50 on that side. This moves bars 34, 38 and 42 on that side of frame E with respect to bars 32, 36, 40 and 44 on that side. This movement changes the configuration of the suction cups to form either the receiving and/or the packing arrays, depending upon which side the bars are being observed. The movement of the set of bars on one side of frame E is independent of the movement of the bars on the reverse side.

On the other side of frame E parallel bar 38 is operably connected to piston rod 62 of pneumatic cylinder 58. As cylinder 56 moves bar 38 on one side of frame E to form the packing array, cylinder 58 moves bar 38 on the other side of frame E to form the rectangular array which corresponds in configuration to the receiving array (FIG. 5) formed of bottles 14 in the receiving means A.

After the packing array has been formed, spaces are present between the cups on the packing side of frame E and therefore between the bottles 14 which are held thereon. Since it is desirable to have the bottles 14 packed as closely as possible to save space within the container, a second movement of the parallel bars 32, 34, 36, 40, 42 and 44 on that side of frame E is undertaken to compress the bars thereby placing the suction cups adjacent to one another. This compressing movement is accomplished by means of pneumatic cylinder 64. When cylinder 64 is energized, piston rod 66 extends to push parallel bar 32 towards parallel bar 38 thus moving the suction cups on bars 32, 34, 36 and 38 closer together. A cable 68 is operably connected between piston rod 66 and parallel bar 44. Cable 68 is wrapped around a pulley 70 operably connected to the base of cylinder 64 such that it does not move as piston rod 66 is extended. Pulley 70 serves to reverse the direction of pull on cable 68 such that as piston rod 66 is extended, cable 68 also moves parallel bar 44 towards parallel bar 38. This moves the suction cups on bars 38, 40, 42 and 44 closer together. The parallel bars, with the exception of center bar 38, are therefore moved to compress the bars and therefore to move bottles 14 closer together and eliminate any extra space therebetween. Of course, this compressing movement only takes place on the side of frame E which is depositing bottles into the container.

Figure 7:
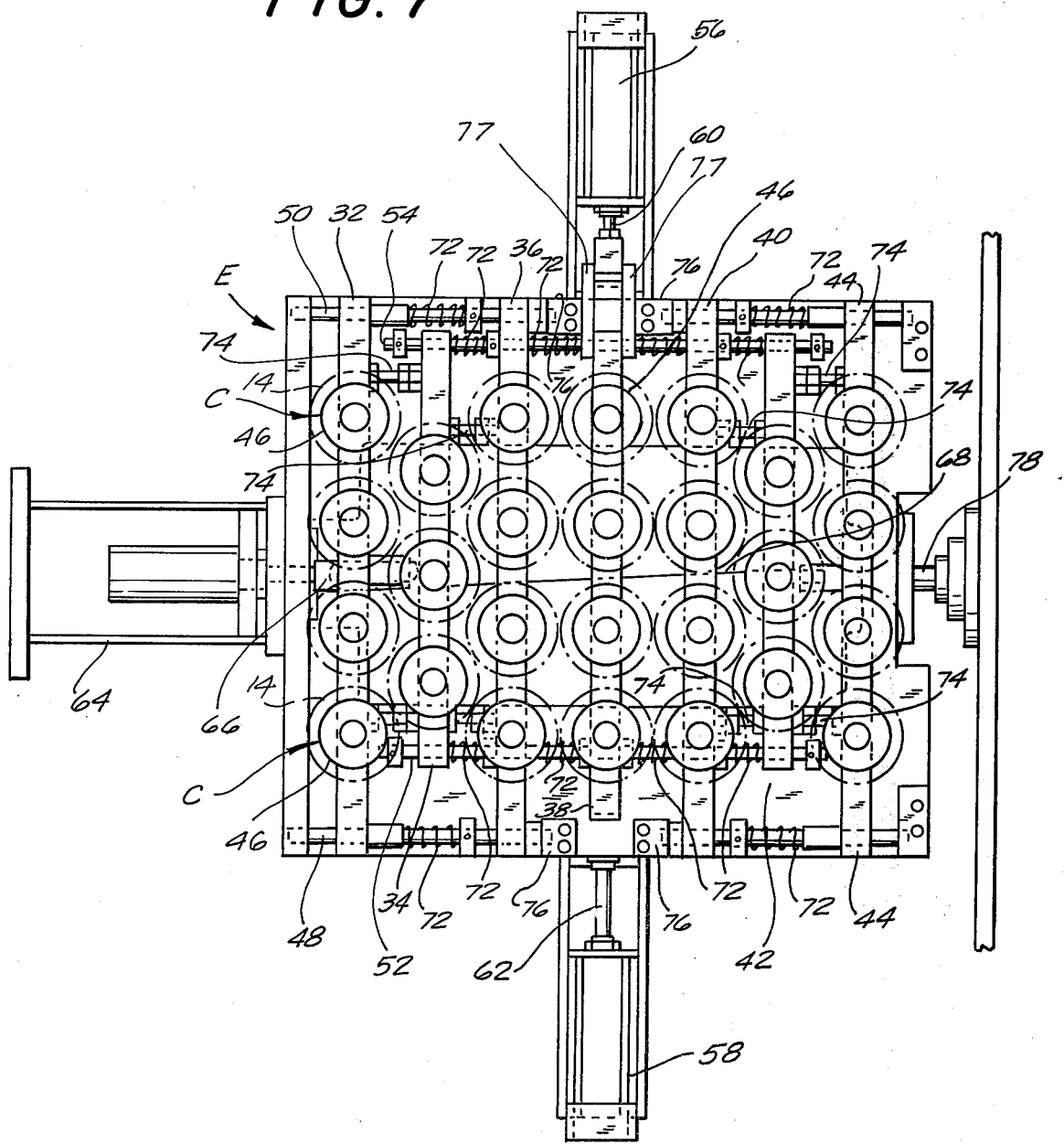
FIG. 7 is a view similar to FIG. 6 wherein the holding means have been repositioned to form a packing array for 26 bottles.
Figure 8:
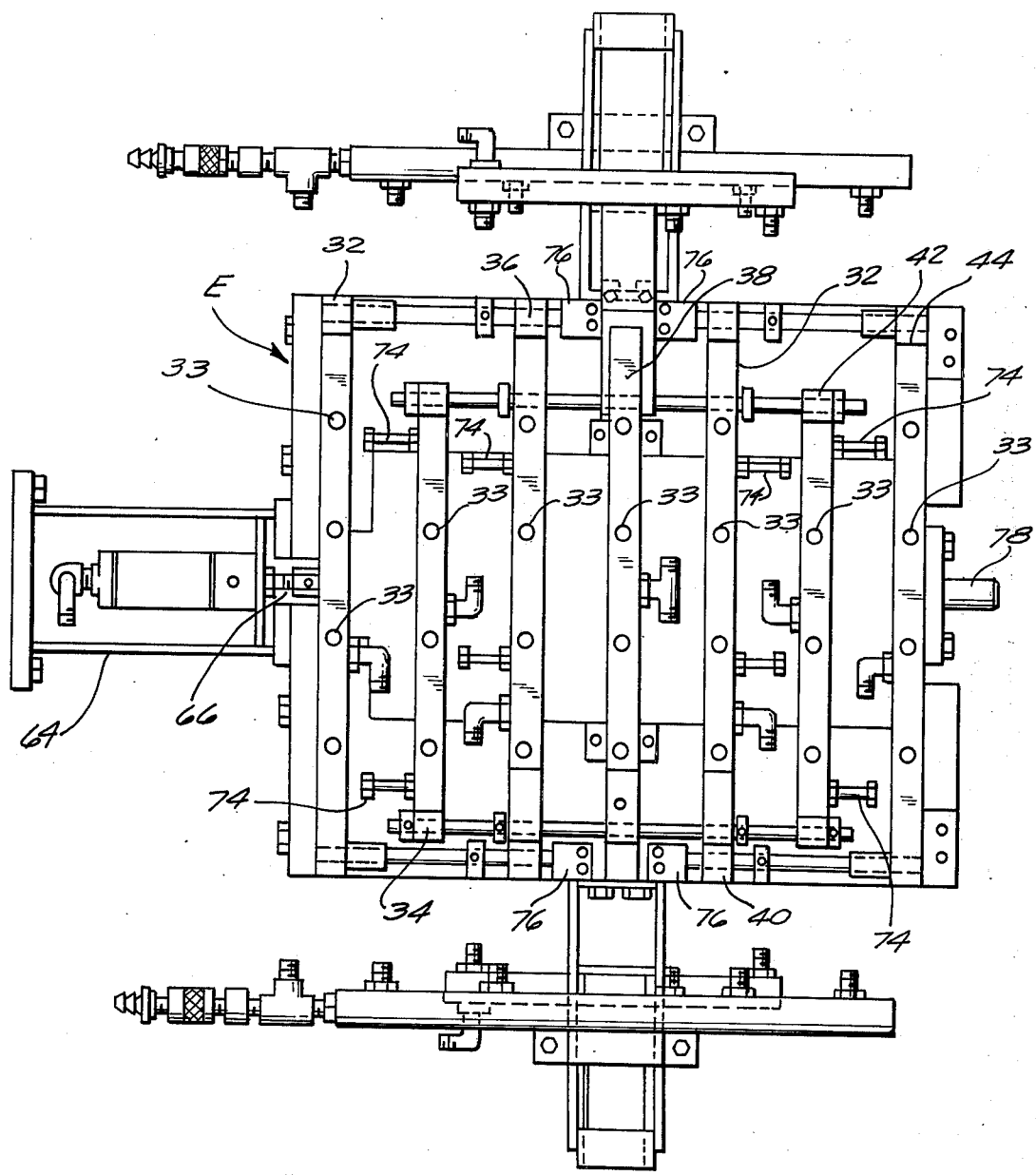
FIG. 8 is a top cross-section elevational view of one side of the frame upon which the holding means are mounted showing the mechanism by which the holding means are moved.

As can be seen in FIGS. 5, 6 and 7, each of the parallel bars 32, 34, 36, 40, 42 and 44 on each side of frame E are connected to the respective perpendicular bars in such a way so that these parallel bars may move along the perpendicular bars during the compression movement. A plurality of springs 72 are provided around each of the perpendicular bars at appropriate locations to provide a biasing force tending to keep parallel bars 32 through 44 separated. The movement of parallel bars 32, 34, 36, 40, 42 and 44 towards bar 38 acts against this biasing force to compress the springs. A plurality of adjustable stops 74 are provided in between the parallel bars such that the compression movement of the bars is limited and the bottles are not broken. Bars 36 and 40 are prevented from moving too close to central bar 38 by means of nonadjustable stops 76. These nonadjustable stops 76 prevent the breakage of the bottles along the parallel bar 38 and the bars adjacent thereto.

Frame E, in its entirety, is rotatable about axis 78 by means of a motor 80, shown in FIG. 1. After receiving means A and transferring means B have been moved out of the way, motor 80 is automatically activated to rotate frame E about axis 78 through an arc of 180°, thus turning the bottles 14 held by holding means C upside down as shown in FIG. 1. The other side of frame E is thus placed in position to receive bottles 14 from receiving means A which is automatically moved back to the transferring position. Gate 20 is automatically lifted to permit feed means D to move additional bottles into receiving means A. When receiving means A is filled to capacity with the retained bottles and the additional bottles from feed means D, the gate 20 is again closed and the packing process reinitiated.

The movement of the suction cups on the bottom side of frame E to form the packing array can take place at any time after the receiving means A has been moved out of the way and before the bottles 14 are released by the suction cups thus depositing them into the carton. The bottles 14 are packed into the carton upside down to facilitate unpacking by the product manufacturer. These cases are normally opened upside down, because this is the easiest way to unpack them, and therefore after unpacking, the bottles are right side up and ready for filling. After the bottles have been released from holding means C on the bottom side of frame E and new bottles have been transferred to the holding means C on the top side, motor 80 is again activated to rotate frame E an additional 180° to its original position.

FIG. 7 shows the packing configuration for an array of 26 bottles. In this configuration, the additional suction cup 46 is present on the parallel member 38 on both sides of frame E. On both sides of frame E parallel member 38 is movably mounted with respect to perpendicular bars 52 and 54 instead of being fixedly mounted as it was in the previous drawings. In the previous drawings extendable piston rod 60 associated with cylinder 56 moved parallel bar 38 to move perpendicular bars 52 and 54. However, in FIG. 7, parallel bar 38 is not moved with respect to parallel bars 36 and 40 because piston rod 60 is not connected thereto. Parallel bar 38 remains stationary with respect to parallel bars 36 and 40 as perpendicular bars 52 and 54 are moved. Rod 60 is connected to perpendicular bar 54 by means of members 77 between which bar 38 slides.

Parallel bar 38 is not connected to move with respect to the adjacent bars because it contains an extra suction cup 46 for the extra bottle. This array is therefore of slightly greater size and different shape because of the extra bottle than the array shown in FIG. 6 which contains only 25 bottles. It will, therefore, take up more space and necessitates a larger carton.

It is desirable to have the frame E and holding means C easily modifiable such that either 25 or 26 bottles may be packed into a container with relatively little mechanical adjustment. To make this modification it is only necessary to make bar 38 slidably mounted on bars 52 and 54, mount cup 46 to bar 38 and provide an additional support structure 31 in the appropriate position in transferring means B. The small amount of mechanical adjustment necessary to change the configuration herein makes it possible to convert the machine from packing 25 bottles to packing 26 bottles with relatively little downtime.

A preferred embodiment of the present invention has been specifically disclosed herein for purposes of illustration. It is apparent that many variations and modifications may be made upon this specific structure disclosed herein. It is intended to cover all of these variations and modifications which fall within the scope of this invention as defined by the appended claims.

I claim:

1. A bottle packing apparatus comprising means for receiving M bottles in an array, where M is an integer larger than four, holding means for holding N bottles, where N is an integer smaller than M, gravity-drop means for transferring N bottles from said receiving means to said holding means leaving M-N bottles in said receiving means, and means for thereafter feeding N bottles into said receiving means, thereby to refill said receiving means with M bottles, said transferring means and said receiving means being movable together between a position adjacent said holding means and a position remote therefrom, said transferring means comprising a bottle support movable relative to said receiving means between first and second positions, said support when in said first position having support parts beneath each of said M bottles, thereby to maintain them within said receiving means, said support when in said second position having support parts beneath only said M-N bottles, thereby maintaining them within said receiving means while permitting said N bottles to drop from said receiving means.

2. The apparatus of claim 1, in which said array of M bottles comprises a plurality of rows, the untransferred bottles normally retaining their positions after the N bottles are transferred, said feeding means comprising means for feeding bottles along said rows, whereby bottles which are thus fed along a row including an untransferred bottle engage said untransferred bottle in refilling said row in said receiving means.

3. The apparatus of claim 1, in which said holding means is mounted for movement between first and second positions, said receiving means is normally closely spaced relative to said holding means when the latter is in its first position, and means for moving said receiving means to a position relatively remote from said holding means before said holding means is moved to said second position.

4. The apparatus of claim 3, in which said transferring means is effective to transfer said N bottles to said holding means in a given array, and means operatively connected to said holding means for thereafter altering the array of said N bottles to a different array containing at least one additional row or column relative to said given array.

5. The apparatus of claim 4, in which said given array is substantially the same array that said N bottles were in when in said receiving means.

6. The apparatus of claim 1, in which said transferring means is effective to transfer said N bottles to said holding means in a given array, and means operatively connected to said holding means for thereafter altering the array of said N bottles to a different array containing at least one additional row or column relative to said given array.

7. The apparatus of claim 6, in which said given array is substantially the same array that said N bottles were in when in said receiving means.

8. A bottle packing apparatus for placing a selected number of bottles arranged in a predetermined pattern into a container comprising A. a frame;
B. a selected number of individual bottle holding means movably mounted on said frame for holding the bottles to be packed, said bottle holding means being movable to form first and second patterns, said first pattern being different from and said second pattern being substantially the same as said predetermined pattern;
C. means for operatively associating a bottle with each of said bottle holding means while said bottle holding means is in said first pattern; and
D. means for moving said bottle holding means to form said second pattern, said patterns comprising arrays and the array of said second pattern containing at least one additional row or column relative to the array of said first pattern;

said frame comprising a plurality of parallel bottle holding means mounting structures, said mounting structures being relatively movable in a first and a second sense, said movement in said first sense being between a first position wherein said bottle holding means form said first pattern and a second position wherein said bottle holding means form an intermediate pattern, said movement in said second sense being between a first position wherein said bottle holding means are spaced apart and a second position wherein said bottle holding means are relatively close together, thereby to form said second pattern;

said mounting structures comprising a plurality of parallel bars some of which are operably interconnected by a first perpendicular bar and the remainder of which are operably interconnected by a second perpendicular bar, said first perpendicular bar being movable relative to said second perpendicular bar such that the parallel bars connected to said first perpendicular bar are movable in said first sense relative to said parallel bars connected to said second perpendicular bar.

9. The apparatus according to claim 8 wherein at least some of said parallel bars are movable along the perpendicular bar to which said parallel bars are operatively connected to achieve movement in said second sense.

10. A bottle packing apparatus for use with a bottle conveyor for placing N bottles arranged in a predetermined pattern into a container comprising a frame, N individual bottle holding means movably mounted on said frame for holding the bottles to be packed, receiving means having a predetermined bottle capacity of M bottles, where M is an integer greater than four and N is an integer less than M, means for transferring N bottles from said receiving means and operatively associating each of said bottles with each of said bottle holding means respectively and retaining the remaining M-N bottles in said receiving means, means for refilling said receiving means, after the selected number of N bottles are operatively associated with said bottle holding means, with a number of additional bottles from said conveyor above the number retained in order that said receiving means is refilled to capacity with retained and additional bottles, said transferring means and said receiving means being movable together between a position adjacent said frame and a position remote therefrom, said bottle holding means being movable to form a first pattern wherein said bottle holding means are arranged to accept the bottles from said transferring means and a second and different pattern which is the predetermined packing pattern, and means for moving said bottle holding means to change patterns, said patterns comprising arrays and the array of said second pattern containing at least one additional row or column relative to the array of said first pattern.

11. The apparatus of claim 10, in which said array of M bottles comprises a plurality of rows, the untransferred bottles normally retaining their positions after the N bottles are transferred, said feeding means comprising means for feeding bottles along said rows, whereby bottles which are thus fed along a row including an untransferred bottle engage said untransferred bottle in refilling said row in said receiving means.

12. The apparatus of claim 10, in which said transferring means is a gravity-drop means.

13. The apparatus of claim 12, in which said holding means is mounted for movement between first and second positions, said receiving means is normally closely spaced relative to said holding means when the latter is in its first position, and means for moving said receiving means to a position relatively remote from said holding means before said holding means is moved to said second position.

14. The apparatus of claim 12, in which said transferring means comprises a bottle support movable relative to said receiving means between first and second positions, said support when in said first position having support parts beneath each of said M bottles, thereby to maintain them within said receiving means, said support when in said second position having support parts beneath only said M-N bottles, thereby maintaining them with said receiving means while permitting said N bottles to drop from said receiving means.

15. The apparatus of claim 14, in which said transferring means is effective to transfer said N bottles to said holding means in a given array, and means operatively connected to said holding means for thereafter altering the array of said N bottles to a different array from said given array.

16. The apparatus of claim 15, in which said given array is substantially the same array that said N bottles were in when in said receiving means.

17. The apparatus of claim 10, in which said transferring means is effective to transfer said N bottles to said holding means in a given array, and means operatively connected to said holding means for thereafter altering the array of said N bottles to a different array from said given array.

18. The apparatus of claim 17, in which said given array is substantially the same array that said N bottles were in when in said receiving means.

* * * * *